United States Patent
Doherty et al.

(10) Patent No.: US 9,363,349 B1
(45) Date of Patent: Jun. 7, 2016

(54) RESCUE MESSAGING SYSTEM

(75) Inventors: Dennis C. Doherty, Issaquah, WA (US); Emmett G. Lenihan, III, Kirkland, WA (US); David Busby, Seattle, WA (US)

(73) Assignee: RescueVoice, LLC, Seattle, WA (US)

( * ) Notice: Subject to any disclaimer, the term of this patent is extended or adjusted under 35 U.S.C. 154(b) by 0 days.

(21) Appl. No.: 12/840,092

(22) Filed: Jul. 20, 2010

Related U.S. Application Data

(60) Provisional application No. 61/241,823, filed on Sep. 11, 2009, provisional application No. 61/226,883, filed on Jul. 20, 2009.

(51) Int. Cl.
  *H04M 1/64* (2006.01)
  *H04M 1/65* (2006.01)
  *H04M 11/04* (2006.01)

(52) U.S. Cl.
  CPC .............. *H04M 1/65* (2013.01); *H04M 11/045* (2013.01)

(58) Field of Classification Search
  CPC ........ H04M 1/0202; H04M 1/03; H04M 1/02
  USPC .................... 379/370, 93.15; 705/2; 600/300; 709/204
  See application file for complete search history.

(56) References Cited

U.S. PATENT DOCUMENTS

| | | | |
|---|---|---|---|
| 6,442,250 B1 * | 8/2002 | Troen-Krasnow et al. | 379/93.15 |
| 2004/0034286 A1 * | 2/2004 | Kasper et al. | 600/300 |
| 2007/0203751 A1 * | 8/2007 | Koblasz | G06F 19/323 705/2 |
| 2007/0220092 A1 * | 9/2007 | Heitzeberg | H04L 12/1818 709/204 |
| 2008/0064371 A1 | 3/2008 | Madhavapeddi | |
| 2008/0258913 A1 * | 10/2008 | Busey | G08B 21/0415 340/540 |

* cited by examiner

*Primary Examiner* — Van D Huynh
(74) *Attorney, Agent, or Firm* — Christensen O'Connor Johnson Kindness PLLC

(57) ABSTRACT

Disclosed is a telephone accessible system that stores one or more messages for a subscriber. The subscriber is given a card with their subscriber number and an access code. In one embodiment, a first responder or other user needing to access the recorded messages, finds the card, calls the system and enters the subscriber number and access code to retrieve one or more of the messages. In one embodiment, the messages are digital audio recordings that contain medical information useful to a first responder before treating the subscriber. The messages can only be changed upon submission of a password that is unique to the subscriber. In one embodiment, the first responder can record an alert message that is transmitted to individuals or entities previously designed by a subscriber to receive an alert message.

10 Claims, 2 Drawing Sheets

RESCUE MESSAGING SYSTEM

CROSS-REFERENCE(S) TO RELATED APPLICATION(S)

This application claims the benefit of U.S. Provisional Patent Application No. 61/226,883, filed Jul. 20, 2009, and U.S. Provisional Application No. 61/241,823, filed Sep. 11, 2009, the disclosures of which are hereby expressly incorporated by reference in their entirety.

BACKGROUND

In many instances, first responders treat victims who are incapacitated or unconscious and are unable to answer basic questions regarding their medical history that may affect their emergency treatment. Such questions can include whether the patient has allergies or other conditions that may affect the type or dose of treatment given before the patient can be rushed to a full service medical center.

To address this problem, numerous types of emergency bracelets, necklaces, wallet cards, etc., have been marketed that provide some of the critical information required by first responders. While such devices work well if worn or carried by the patient, there is a limited amount of information that can be stored on such devices or cards. In addition, it is difficult to easily update the information stored thereon if a patient's medical condition changes.

Therefore there is a need for a system whereby users can provide information to first responders that informs them of any medical condition or other information that may affect how the patient is treated or to provide instructions as to who to call etc. The system should be easily accessible by all first responders and should allow a subscriber to easily update the information.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

To address the above concerns, the technology disclosed herein relates to a messaging system for allowing first responders or other users to retrieve messages from subscribers that may be unconscious or otherwise incapacitated before receiving medical treatment. The messaging system includes a database that stores one or more messages that can be accessed by the first responders or other users. The messaging system is accessed by a telephone interface using a wireless, landline, or voice over Internet protocol (VoIP) communication device. Upon access to the system, the user enters a subscriber identification number and an access code to retrieve messages stored for the particular subscriber. The stored messages can only be changed upon submission of a password that is personal to the subscriber.

In another aspect, the messaging system is also accessible via an internet (WWW) interface to allow subscribers to set up accounts, change their personal password, billing information, or perform other administrative functions. The messaging system also interfaces with a billing system to charge the subscribers for use of the system. In another aspect, the messaging system stores alert messages recorded by a first responders or other users. After storing an alert message, the alert message for a particular subscriber is then transmitted to individuals whose contact information has been previously stored by the messaging system.

The system is not limited to storing only emergency medical information but can be used to store information on pets or children, insurance or other text based information or to provide a means to selectively broadcast messages to a group of individuals approved to access the messages.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
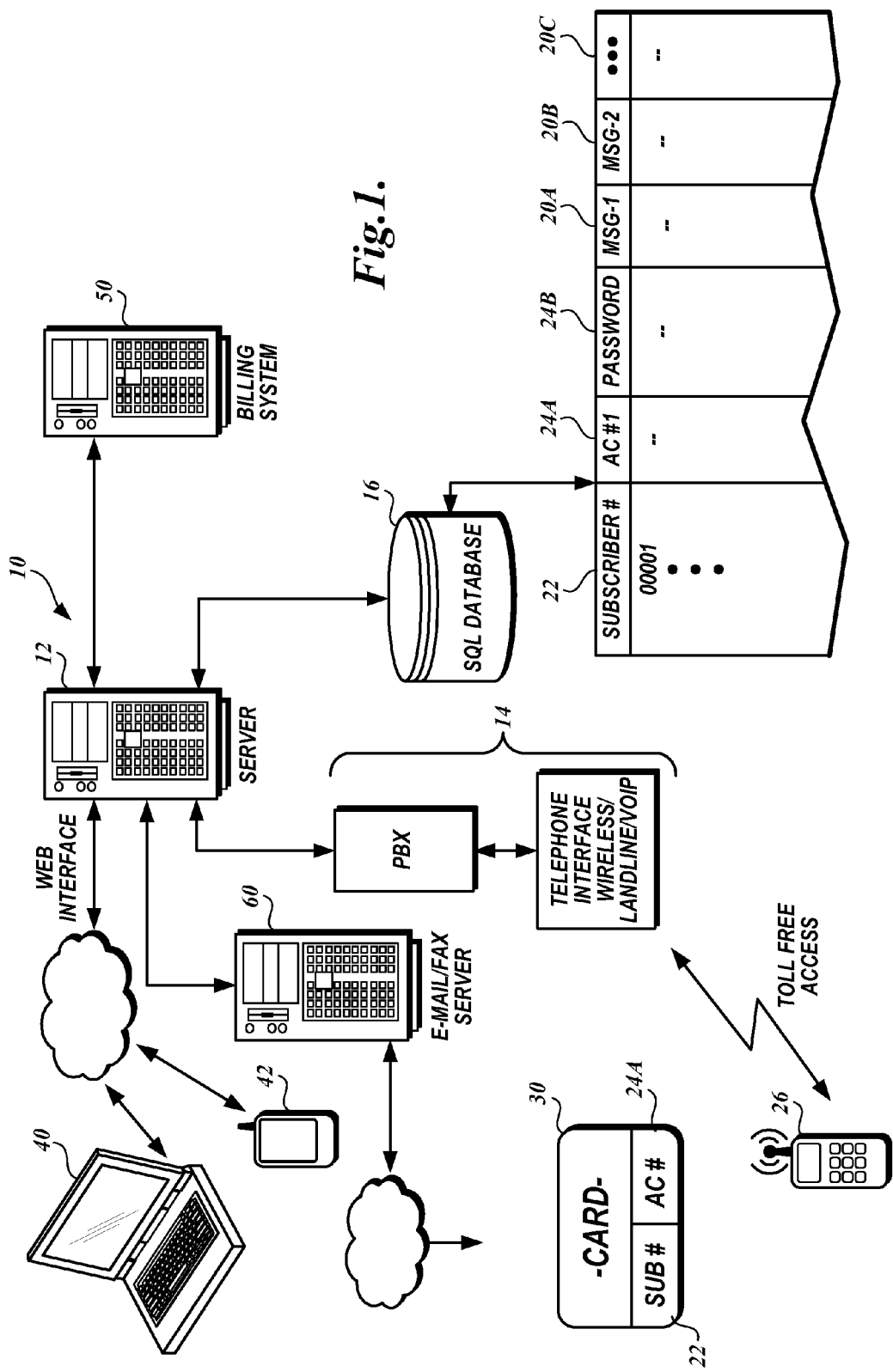
FIG. 1 is a block diagram of a messaging system in accordance with one embodiment of the disclosed technology.

As described above, the disclosed technology is a messaging system for allowing a first responder or other user to access stored messages associated with a subscriber via a telephone communication device. The messages may inform the user of a subscriber's medical conditions, their regular doctor, next of kin, or any other information that a subscriber would want someone to know in the case of an emergency. Although the following description is primarily directed to digital audio messages that contain medical information such as prior conditions, allergies, medications taken, etc., it will be appreciated that the stored messages could be stored in the form of text or other alphanumeric codes that represent the information. Alternatively the messages may relate to other information besides medical information such as a subscriber's expected itinerary in case they get lost or become injured in the wilderness etc.

The messaging system 10 includes one or more server computers 12 that are suitably programmed to perform the functions described. The server computer 12 is accessed with a telephone communication device 26 through a telephone interface 14 such as a private branch exchange (PBX), public switched telephone network (PSTN), a voice over internet protocol (VoIP) server or other device or protocol that allows a user to interact with the messaging system via a telephone. For the purposes described herein a telephone includes, but is not limited to, a mobile telephone (cellular telephone), a landline phone, a satellite phone, or a computing device with VoIP or other communication capabilities. The server computer 12 provides a spoken menu of allowed options that are selected by a user entering commands with touch tones or other alphanumeric codes on their telephone 26.

The server computer 12 is programmed to write message data to and read message data from an SQL compatible or other database 16. The database 16 stores messages 20A, 20B, 20C, etc. for a number of subscribers. Each message is associated with a particular subscriber number 22, an access code 24A, and a personal password 24B.

In order for a user to access a message stored for a particular subscriber, the user utilizes their telephone 26 to access the messaging system 10. The user retrieves a subscriber number 22 and an access code 24A from a card 30 that is located on or carried by the incapacitated subscriber. Alternatively, the information printed on the card 30 may be printed on a telephone or displayed at another prominent location at the subscriber's house where the user is likely to see it.

To access the messaging system 10, the user dials a telephone number associated with the messaging system 10. Preferably, the telephone number is a toll-free access number printed on the card 30. The messaging system prompts a user to enter a subscriber number 22 that is unique to the particular subscriber. The messaging system then prompts the user to enter the access code 24A for the particular subscriber. Upon successful entry of the subscriber number 22 and the access code 24A, the server computer 12 retrieves from the database memory one or more of the stored messages 20A, 20B, 20C. The retrieved messages are then transmitted back to the user via the telephone communication link.

The server computer 12 also supports an internet (e.g. World Wide Web) interface by which a subscriber can access the system using their computer 40, personal digital assistant (PDA) 42, cellular telephone with internet access capability or other computing device. The subscriber uses the internet access to allow them to perform such administrative functions as changing the level of service required, changing their password, setting up additional accounts, changing their billing information, canceling the service, or any other function desired. In one embodiment, a subscriber is prompted to enter their password 24B known only to them and not printed on the card 30 in order to be allowed to record new messages, change their billing information, store or update messages etc. A billing system 50 is also in communication with the server computer 12 to allow the messaging system to periodically charge subscribers for use of the system.

In an alternative embodiment, the telephone 26 is programmed to transmit its location as determined from a GPS receiver or other location device or technique included in or performed by the telephone 26. Depending upon the level of security required, using a mechanism to verify the appropriate subscriber number, messages may be retrieved without requiring entry of an access code 24A. For example, if the messaging system detects that a user has called the system from a home address associated with a particular subscriber, the system may retrieve one or more messages without requiring the user to enter the subscriber's subscriber number or access code. For example, the messaging system may use the same technology for locating calls to an emergency 911 service to determine the location of the caller. Based on the location, the subscriber number for the incapacitated subscriber may be determined.

In another alternative embodiment, a subscriber number may be determined based on the caller identification (caller_id) that is associated with a telephone number assigned to a particular subscriber. For example, if a first responder or other user accesses the messaging system via the subscriber's home telephone, the system may retrieve the messages without requiring entry of the subscriber's subscriber number.

To record their messages, a subscriber may accesses the system using a telephone to enter their subscriber number 22 and password 24B. Upon successful entry, the subscriber follows a series of voice prompts asking them to record a message. If the user records and is happy with the message, they can exit the system to record another message or perform other functions. The subscriber may also follow the voice prompts to enter or change their password in response to a menu of options provided by the server.

If first responders or other emergency users carry internet capable telephones, then it will be appreciated that the system may store and recall alphanumeric information for the messages that is transmitted to the users telephone in the form of one or more web pages. In this case, the subscriber could update their messages using a computer rather than using a telephone. In yet another embodiment, a subscriber may record digital audio messages and upload them to the messaging system as audio files using the internet interface rather than using a telephone to record the messages.

As indicated above, the messaging system 10 can be used to store messages other than medical conditions to be used by first responders. For example, a physician may set up an account for a patient so that, with patient permission, the family of the patient can get up to date information of the patient's condition, treatment, diagnosis etc. In this example, the patient would let each member of their family who is eligible to hear the information know their subscriber number and access code. The only person who can change the information heard is the physician who has the password to the account.

In yet another example, the system can be used to store information about pets that may become lost. A tag on the pet lists the toll-free telephone number of the system, a subscriber number and access code assigned to the pet that can be entered by individuals to determine the owner of the pet and any other information that might be required for the safe return of the pet. Unlike a traditional pet tag, the use of the message system described gives a pet owner the ability to easily update the information given without having to buy a new pet tag.

As will be appreciated from the above, the system provides a simple mechanism for first responders or other users to obtain information provided by a subscriber in times of need. Examples of other users include but are not limited to teachers, bus drivers, family and friends of the subscriber, employers or others that need to obtain information about the subscriber when the subscriber cannot speak for themselves. The system allows a first responder or other user the ability to retrieve the stored information upon proper identification of the subscriber such as by the submission of a subscriber number and access code. However, only the subscriber can change the message information upon successful entry of a password to the account.

In yet another alternative embodiment, the messaging system stores additional information besides voice messages. For example, the system can store insurance information, the names of attorneys or other individuals who have a copy of a will or other information that a subscriber wants the caller to have access to. The messaging system 10 is connected to an e-mail/fax server 60 so that a user has the option to have this information sent electronically to an e-mail address or fax machine that they designate from a keypad on their telephone or from a computer.

In yet another embodiment, the database stores contact information for one or more individuals or entities who should receive emergency information in the event that the messaging system is accessed by a first responder for a subscriber. In this embodiment, a subscriber supplies contact information, such a phone number, for each person or organization that should receive an alert message in the event that the system is accessed by a first responder or other user for the subscriber. The contact information might include telephone numbers for a husband/spouse, clergy, son/daughter, employer etc. Alternatively, the contact information might be an e-mail address, or IP address of a computer used by the designated individual or entity.

The messaging system is also configured to prompt a user or first responder to leave an alert message if they access the messaging system on behalf of a subscriber. For example, if a first responder arrives at a scene and finds the subscriber Ms. Jones unconscious or incapacitated, the first responder accesses the messaging system 10 by calling a toll free number and supplying Ms. Jones' subscriber number 22 and access code 24A. As indicated above, in one embodiment, the subscriber number 22 and access code 24A is printed on a card carried by the subscriber.

Upon accessing the messaging system 10, the first responder hears one or more messages that are left by the subscriber to be heard by a first responder. After the messages are played or if an option from a voice menu is selected, the first responder is then prompted to leave an emergency alert message. Such alert message might say "Hello, this is David from the Seattle Fire Department. There is no emergency but we're here with Ms. Jones who fell down and are taking her to the hospital for evaluation."

Figure 2:
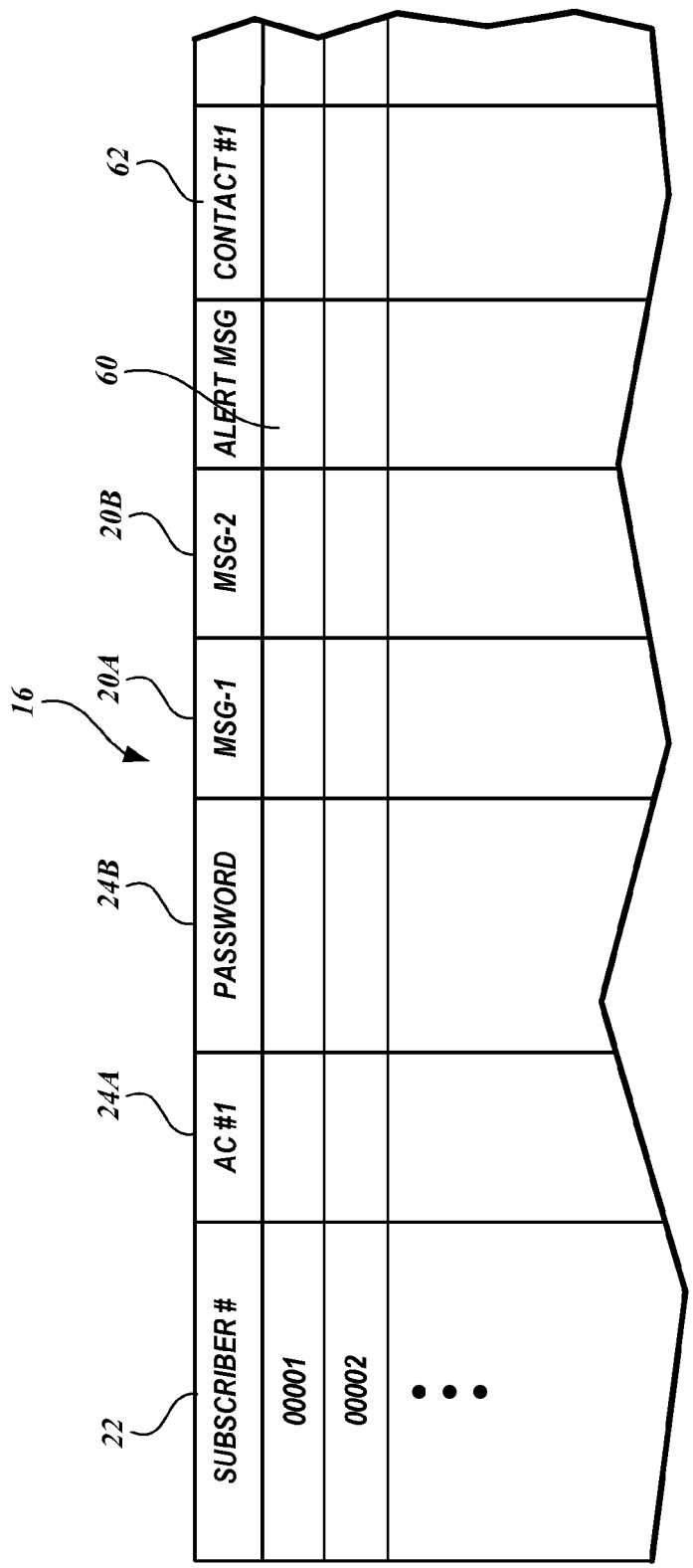
FIG. 2 illustrates a messaging system database that stores alert messages and contact information for individuals designated by a subscriber to receive an alert message.

Upon indicating that the alert message is complete (such as by hanging up or pressing a predefined key on a keypad, the messaging system stores the alert message 60 in the database 16 as shown in FIG. 2. In another embodiment, the first responder may have a third party (e.g., a dispatcher) record the alert message. Once an alert message is recorded, the messaging system then transmits the recorded alert message 60 to all of the individuals or entities whose contact information 62 has been previously provided and stored in the database 16.

To send the stored alert message 60 to the designated contacts, the system recalls the contact information 62 for each designated contact from database. The messaging system 10 then sends a message to the individual or entity using the recalled contact information. Phone calls can be placed to individuals or entities having phone numbers stored in the database. E-mails with a link to the recorded alert message from the first responder can be sent to those individuals or entities having an e-mail address stored in the database etc.

An individual getting the message then hears the recorded alert message from the first responder or accesses the recorded alert message depending on the type of device on which they receive the message from the messaging system. If the individual knows the subscriber's subscriber number and access code, they may also retrieve additional messages from the messaging system 10.

While the preferred embodiment of the invention has been illustrated and described, it will be appreciated that various changes can be made therein without departing from the scope of the invention.

While illustrative embodiments have been illustrated and described, it will be appreciated that various changes can be made therein without departing from the spirit and scope of the invention.

The embodiments of the invention in which an exclusive property or privilege is claimed are defined as follows:

1. An emergency messaging system, comprising:
   a server computer that is configured to store a number of subscriber-recorded voice messages recorded by a number of subscribers of the system and to store contact information for a number of emergency contacts entered by the subscribers of the system; and
   a telephone interface coupled to the server computer through which a user can listen to a subscriber-recorded voice message recorded by a subscriber,
   wherein the server computer is further configured to, in response to at least connection of a telephone call from the user and receiving from the user a subscriber number and an access code that are associated with the subscriber:
      play the subscriber-recorded voice message recorded by the subscriber to the user through the telephone interface;
      prompt the user to record an emergency alert message;
      store a recorded emergency alert message from the user designated for the emergency contacts entered by the subscriber; and
      automatically deliver the recorded emergency alert message to the emergency contacts entered by the subscriber; and
   wherein the server computer is further configured to:
      detect a geographic location of a telephone used by the user to access the server computer; and
      in response to determining that the geographic location matches a geographic location associated with the subscriber, play a recorded message associated with the subscriber without receipt of the subscriber number and access code.

2. The emergency messaging system of claim 1, wherein the server computer is further configured to store a recorded message that is associated with the subscriber but is recorded by the user after entry of the subscriber's subscriber number and access code.

3. The emergency messaging system of claim 1, wherein the subscriber number and access code are printed on a card that is configured to be carried by the subscriber.

4. The emergency messaging system of claim 1, wherein the server computer is further configured to record a message from the subscriber upon receipt of the subscriber number, access code, and a password associated with the subscriber.

5. The emergency messaging system of claim 1, wherein the server computer is further configured to detect a caller identification number of a telephone used to access the messaging system and to play a message associated with the subscriber if the caller identification number detected matches a number associated with the subscriber.

6. A computer-implemented method comprising:
   by a server computer, storing a subscriber-recorded voice message recorded by a subscriber of an emergency messaging system;
   by the server computer, storing contact information for one or more emergency contacts for the subscriber;
   in response to at least connection of a telephone call and receipt by the server computer from a user of a subscriber number and an access code that are associated with the subscriber:
      by the server computer, playing the subscriber-recorded voice message recorded by the subscriber to the user through a telephone interface;
      by the server computer, prompting the user to record an emergency alert message designated for the emergency contacts for the subscriber;
      by the server computer, storing a recorded emergency alert message; and
      by the server computer, automatically delivering the recorded emergency alert message to the emergency contacts for the subscriber;
   by the server computer, detecting a geographic location of a device used to access the server computer; and
   by the server computer, in response to determining that the geographic location of the device used to access the server computer matches a geographic location associated with the subscriber, playing a recorded message associated with the subscriber without receipt of the subscriber number and access code.

7. The method of claim 6, further comprising storing a user-recorded message that is associated with the subscriber but is recorded by the user after entry of the subscriber's subscriber number and access code.

8. The method of claim 6, wherein the subscriber number and access code are printed on a card that is accessible by the user.

9. The method of claim 6, wherein the storing of the subscriber-recorded message is authorized upon receipt of the subscriber number, access code, and a password associated with the subscriber.

10. The method of claim 6, further comprising:
- by the server computer, detecting a caller identification number of a telephone used to access the messaging system; and
- by the server computer, playing a message associated with the subscriber if the caller identification number detected matches a number associated with the subscriber.

* * * * *